J. A. RAKESTRAW.
Plate-Lifter and Toaster.
No. 163,105. Patented May 11, 1875.
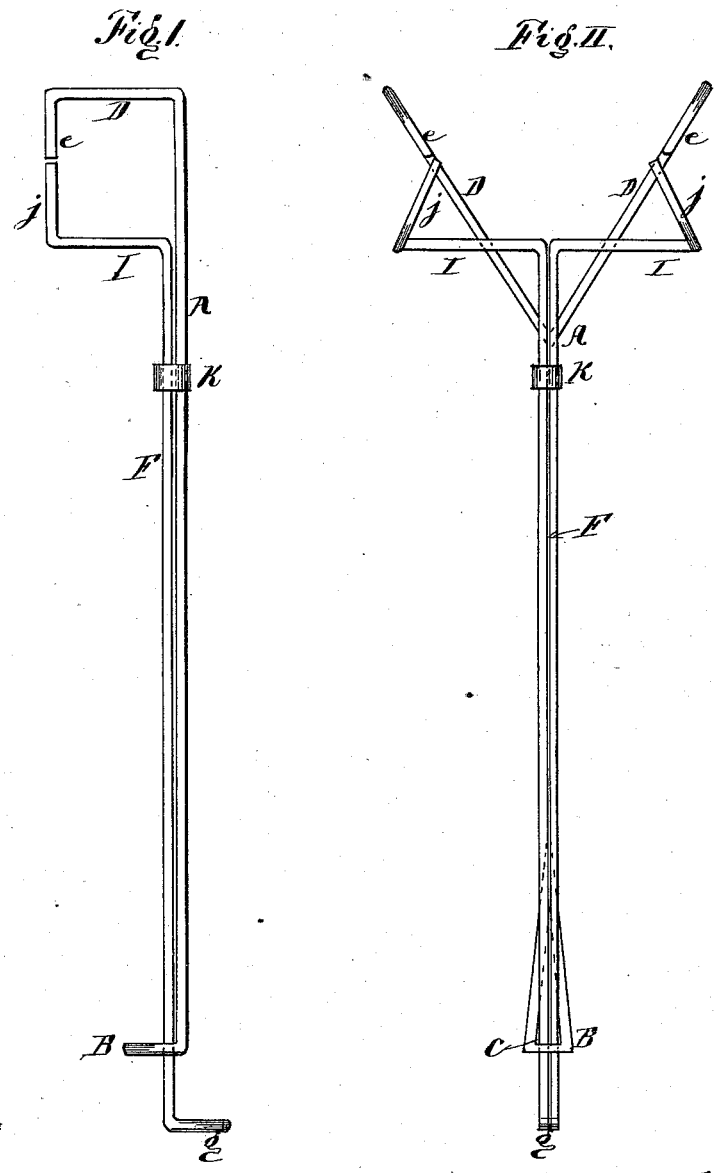

UNITED STATES PATENT OFFICE.

JOHN A. RAKESTRAW, OF ALTOONA, PENNSYLVANIA.

IMPROVEMENT IN PLATE-LIFTERS AND TOASTERS.

Specification forming part of Letters Patent No. 163,105, dated May 11, 1875; application filed February 23, 1875.

*To all whom it may concern:*

Be it known that I, JOHN A. RAKESTRAW, of Altoona, Blair county, State of Pennsylvania, have invented certain Improvements in Combined Plate-Lifter and Toaster, of which the following is a specification:

The object of my invention is to provide for a cheap and adjustable combined plate-lifter and toaster.

My invention consists in forming, of wire or sheet metal, two forks with handles, the longest of which is placed above the shortest, and held together by a band, fastened to the handle of the lower fork, and by a slot in the bent end of the longer handle. The prongs of the fork of the shorter handle are bent downward and outward, and the prongs of the longest handle are bent downward and inward, in such a manner that the ends of the prongs point to each other. The end of the longest handle, in which the slot is cut, is bent downward, and the end of the shortest handle is bent upward.

By holding the bend of the shortest handle between the thumb and the forefinger, and employing the second finger to move back or forward the bend of the largest handle, the forks are moved in or out, as may be required, in order to take hold of a heated plate or dish, or for toasting any article of food.

In order to describe my invention more fully, I refer to the accompanying drawing, forming a part of this specification.

Figure I is a side view of my improved combined plate-lifter and toaster. Fig. II is a plan view of the same.

A is the longest handle, with loop B, in which the slot C is cut. D D are the forks of the longest handle, with prongs *e e*. F is the shortest handle, with bend *g*, forks I I, and prongs *j j*. K is a band fastened to the handle F, and extending over handle A.

Having thus described my invention, I would have it understood that I am aware that a plate-lifter, composed of hooked arms, a shank, and a sliding hook, has been described by George O. Roe in the specification of his Patent No. 74,598, dated February 18, 1868; and also that a plate-lifter and toaster, consisting of rods, hooks, and a slide, has been described by T. D. Keith in the specification of his Patent No. 97,093, dated November 23, 1869. I therefore lay no claim to such devices; but

What I do claim, and desire to secure by Letters Patent, is—

A combined plate-lifter and toaster, constructed with a handle, A, having forks D D, provided with prongs *e e*, and a loop, B, and band K, adapted to receive, with capability of backward and forward motion, a handle, F, provided with a bend, *g*, and forks 1, having prongs *j j*, the whole being constructed and operating in the manner and for the purpose described.

JOHN A. RAKESTRAW.

Witnesses:
JAMES LOUDON,
R. H. GRIFFIN.